Oct. 27, 1925.

J. A. FORNEY 1,559,038

SWITCH FOR VEHICLE SIGNAL SYSTEMS

Filed Aug. 31, 1923    2 Sheets-Sheet 1

Inventor
John A. Forney,

Attorney

Oct. 27, 1925.

J. A. FORNEY 1,559,038

SWITCH FOR VEHICLE SIGNAL SYSTEMS

Filed Aug. 31, 1923  2 Sheets-Sheet 2

Inventor

John A. Forney,

By [signature], Attorney

Patented Oct. 27, 1925.

1,559,038

UNITED STATES PATENT OFFICE.

JOHN A. FORNEY, OF READING, PENNSYLVANIA.

SWITCH FOR VEHICLE SIGNAL SYSTEMS.

Application filed August 31, 1923. Serial No. 660,279.

*To all whom it may concern:*

Be it known that I, JOHN A. FORNEY, a citizen of the United States, residing at Reading, in the county of Berks and State of Pennsylvania, have invented certain new and useful Improvements in Switches for Vehicle Signal Systems, of which the following is a specification.

This invention relates to improvements in signal devices for vehicles, and it is intended more particularly for use on motor driven vehicles provided with a source of electrical energy, such as a battery.

The object in the present invention is to provide a vehicle with signals in the form of electric lights, capable of actuation either manually or through the medium of the steering mechanism, to the end that the driver of the vehicle may signal to both the oncoming vehicle or the vehicle in the rear, his intention to turn to the right or left before such turn is made, and to continue such signal after the turn has been started and until the line of travel has again assumed a straight away course.

To this end a signal lamp has been placed on the front and rear corners of the vehicle, the lamps on the right front and the rear right hand are adapted to signal in unison, as are also the front left and rear left lights.

Means are provided for signalling from either the right or left side of the vehicle manually, and also to continue such signals by the turning in either direction, of the steering post.

Figure 1:
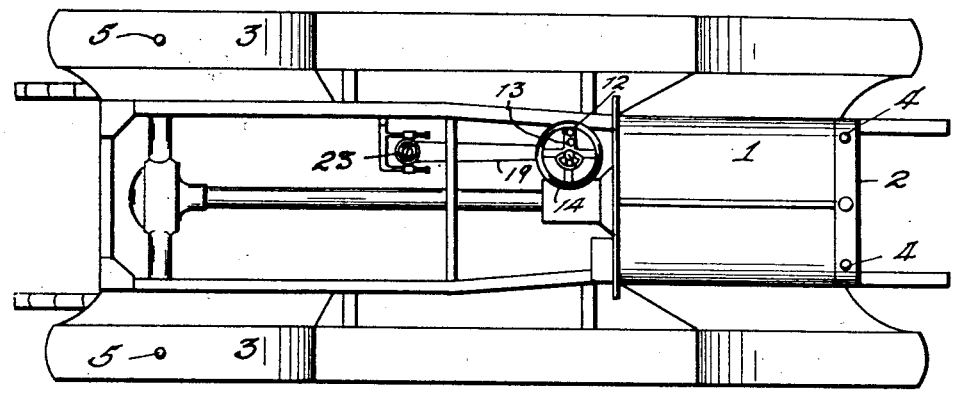
Figure 2:
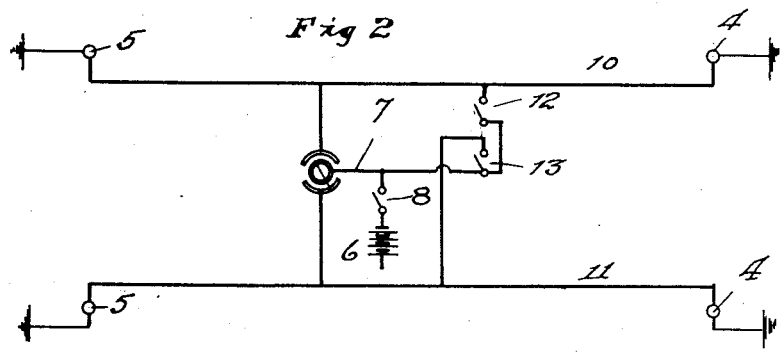
Figure 3:
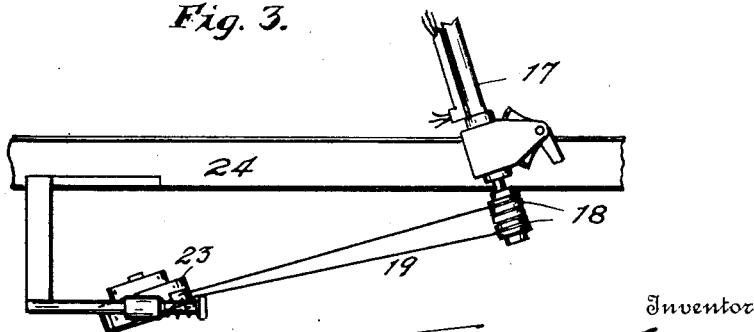
Figure 3:
Figure 4:
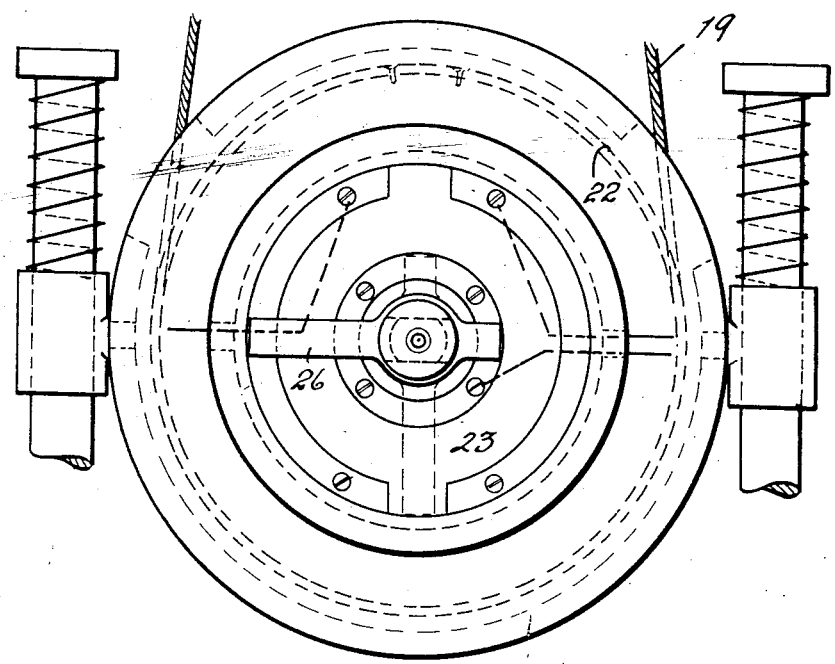
Figure 5:
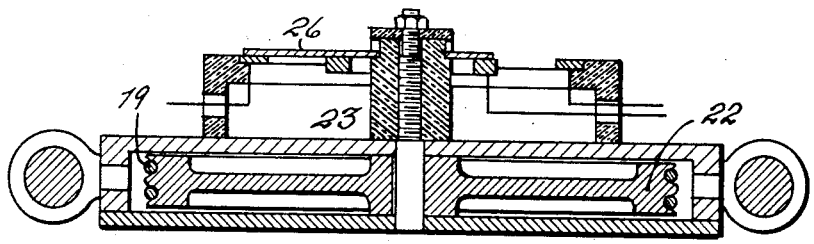

The invention is more fully described in the following specification and clearly illustrated in the accompanying drawings, in which:

Figure 1 is a plan view of a vehicle with my device applied thereto. Figure 2 is a diagram of the system. Figure 3 is a detail in side elevational view, of the steering post operating mechanism for the signals. Figure 4 is a plan view, in enlarged form, of the switch and Figure 5 is a sectional, central view thereof.

The numeral 1 designates the hood of an ordinary vehicle with the radiator at the forward end thereof, 2. The numeral 3 designates the fenders. On the right and left forward corners of the radiator are located electric lamps 4 and on the right and left rear fenders are also located electric lamps 5. The numeral 6 designates a source of electrical energy, shown in the form of a battery, and 7 designates an electric system connecting this battery with the lights 4 and 5. Interposed between the battery and the system is placed a switch 8 for closing the circuit.

The wiring system comprises two lines, 10 and 11, one for each side of the vehicle, and switches 12 and 13 are respectively located in these lines, so that either side of the vehicle may be operated independently of the other. The actuating means for these switches are located in easy reach of the hand of the operator, preferably on the steering wheel 14 as shown in Figure 1.

When therefore, it is desired to signal to others the intended direction to be taken by the vehicle, the operator will press the switch button connected with either side line of the system, showing that the car is to proceed in the direction of the lights.

The steering post 17 is provided with a worm grooved pulley 18 at its lower extremity, and over this pulley a cable operates, 19. The cable is endless, and extends to and surrounds a grooved pulley 22 on a switch 23, suspended from the vehicle frame 24 and connected with the electric system 7, as shown clearly in the diagram Fig. 2.

The switch comprises, in part, a casing member 30 and this is mounted preferably, upon a pair of parallel rods 31 each of which is provided with a coil spring 32, which springs tend to keep the cable taut.

When the steering wheel is turned in the direction to be followed by the vehicle, the cable will turn the movable member of the switch 26 bringing it into contact with one of the terminals 29 and close the circuit on one side of the system, namely the one toward which the vehicle is turning.

Thus it will be seen, that after the driver has first indicated by signal, the direction which he intends to take, by pressing one of the switch buttons on the steering wheel, the actuation of the steering wheel in that direction will close a circuit and keep the lights on that side lighted after the button has been released, and this lighted signal will remain until the car has assumed a straight away course, which will return the switch parts to neutral and extinguish the lights.

The lamps may of course be placed at any convenient points on the vehicle, and may be of any desired shape or color, and the exact formation of the respective parts may be varied to suit circumstances that may arise in the process of installing the system on different makes or vehicles, and I do not therefore wish to limit myself to the exact construction shown and described, but

What I claim and desire to secure by Letters Patent is:—

A switch device for vehicles comprising a casing, a pair of parallel rods on which the casing is mounted, a coil spring surrounding each of said rods, two terminals and a contact member, a steering post, a worm grooved pulley on the lower end of the post, a grooved pulley connected with the contact member, an endless cable connecting the worm pulley on the steering post with the grooved pulley, whereby the actuation of the steering post will effect a contact between said contact member and either of the terminals.

In testimony whereof I affix my signature.

JOHN A. FORNEY.